US005677392A

United States Patent [19]
Serizawa et al.

[11] Patent Number: 5,677,392
[45] Date of Patent: Oct. 14, 1997

[54] REINFORCED COMPOSITE RESIN MATERIAL AND METHOD FOR ITS PRODUCTION

[75] Inventors: Hajime Serizawa; Ayako Migita; Kenji Hijikata, all of Shizuoka, Japan

[73] Assignee: Polyplastics Co. Ltd., Osaka, Japan

[21] Appl. No.: 591,911

[22] Filed: Jan. 25, 1996

[30] Foreign Application Priority Data

Jan. 25, 1995 [JP] Japan .................................... 7-010047

[51] Int. Cl.$^6$ .......................... C08L 71/12; C08L 81/04; C08L 81/06
[52] U.S. Cl. .......................... 525/397; 525/450; 525/534; 525/535; 525/537
[58] Field of Search .................................... 525/397, 534, 525/535, 537, 450

[56] References Cited

U.S. PATENT DOCUMENTS 4,276,397  6/1981  Froix .
4,460,736  7/1984  Froix .

FOREIGN PATENT DOCUMENTS 0553846  8/1993  European Pat. Off. .
A-6-145534  5/1994  Japan .
8800605  1/1988  WIPO .

OTHER PUBLICATIONS

Polymer Preprints, Japan, vol. 41, No. 9, pp. 3918–3920, (1992). Abstract Attached.

*Primary Examiner*—Patricia A. Short
*Attorney, Agent, or Firm*—Burns, Doane, Swecker & Mathis, L.L.P.

[57] ABSTRACT

There is provided a direct method for producing a reinforced composite resin material by polymerizing a specific copolyester having high heat resistance and a reinforcing effect in the presence of a molten preformed thermoplastic polymer. In the production of the reinforced composite resin material, a fibrillar copolyester is produced by the polymerization of specific hydroxy aromatic carboxylic acid monomers and is generated within a molten preformed thermoplastic polymer while undergoing a shearing stress. Such shearing stress causes the formation of the requisite fibrous reinforcement preferably having an aspect ratio of at least 3 within the preformed thermoplastic polymer. Such hydroxy aromatic carboxylic acid monomers preferably have acetylated hydroxyl groups when copolymerized. Additionally, substituents other than hydrogen atoms optionally may be present on the rings of the aromatic monomers at the time of the copolymerization to form the fibrillar copolyester.

8 Claims, No Drawings

REINFORCED COMPOSITE RESIN MATERIAL AND METHOD FOR ITS PRODUCTION

FIELD OF THE INVENTION

This invention relates to the production of a reinforced composite resin material. More specifically, it concerns a reinforced composite resin material that is obtained by polymerizing a copolyester having high heat resistance and a reinforcing effect in the presence of a molten preformed thermoplastic polymer.

PRIOR ART

A method for obtaining a composite resin material by polymerizing a homopolyester fibrous material in a polymer matrix is detailed in JP-A-6-145534 (the term "JP-A" as used herein means an "unexamined published Japanese patent application"), Polymer Preprints, Japan Vol. 41, No.9, pages 3918-3920 (1992), and the like.

However, in the prior art method for obtaining a composite material directly by polymerizing a fibrous polymer as a reinforcement in a polymer matrix, the fibrous polymer is limited to a homopolyester for the generation of whiskers. For this reason, the degree of freedom in heat resistance such as softening point, or characteristics such as mechanical strength, flexibility, and thermal stability has been limited to an extremely narrow range.

SUMMARY OF THE INVENTION

In view of the shortcomings of the prior art, the inventors of the present invention have conducted intensive studies directed a method for obtaining a composite resin material having a greater range of physical properties, and advantageous reinforcement provided by a fibrillar polymer that is formed in situ.

The invention relates to a process for producing a composite resin material, which comprises the step of polymerizing at least two different monomers selected from the group consisting of parahydroxybenzoic acid, 2-hydroxy-6-naphthoic acid, and 4'-hydroxy-4-biphenylcarboxylic acid, including the acetylated forms of such monomers, in a molten preformed thermoplastic polymer while imparting a shearing stress to the reaction mixture to fibrillate the obtained copolyester within the thermoplastic polymer. Substituents other than hydrogen atoms optionally may be substituted on aromatic rings of such monomers. These include alkyl groups (e.g., methyl, ethyl, etc.), alkoxy (e.g., methoxy, ethoxy, etc.), phenyl, and halogen atoms (e.g., Cl and Br).

It is preferable that one monomer be provided in more than 0 to 15 mole percent (i.e., in a concentration of no more than 15 mole percent) and another monomer be provided in 85 to less than 100 mole percent (i.e., in a concentration of at least 85 mole percent). A more preferable monomer ratio ranges from 1 to 12 mole percent and 88 to 99 mole percent. The amount of the copolyester preferably ranges from 1 to 30 percent by weight based on the weight of the thermoplastic polymer.

It is preferable that the copolyester has the formula (1):

  formula (1)

wherein m and n are molar fractions of the recurring units of the polymer of the formula (1), provided that m is 85 or more and less than 100 and n is more than 0 and 15 or less, $Ar_1$ is a group selected from 1,4-phenylene, 2,6-naphthyl, and 4,4'-biphenyl, and $Ar_2$ is at least one group selected from 1,4-phenylene, 2,6-naphthyl, and 4,4'-biphenyl with the proviso that $Ar_1$ and $Ar_2$ are different. The monomers may possess acetylated hydroxyl groups. Also, substituents other than hydrogen atoms optionally may be substituted on the aromatic rings of such monomers as previously discussed.

It is preferable that a zone for accomplishing the shearing stress is formed and generated during the polymerization with a stirrer and/or an extruder at a shearing speed of at least 2.0 $sec^{-1}$. An acetoxy group may be introduced into the hydroxy aromatic carboxylic acid in a reactor and the resulting acid may be polymerized directly. The reaction pressure in a reactor may be reduced during polymerization.

It is preferable that $Ar_1$ is 1,4-phenylene and $Ar_2$ is 2,6-naphthyl and/or 4,4'-biphenyl.

The invention includes as an embodiment a method for producing a composite resin material, which comprises polymerizing and generating a fibrillar copolyester represented by the following formula (1):

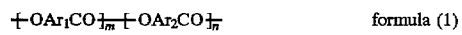  formula (1)

wherein m and n are molar fractions of recurring units of the polymer of formula (1), provided that m is 85 or more and less than 100 and n is more than 0 and 15 or less, $Ar_1$ is a group selected from 1,4-phenylene, 2,6-naphthyl and 4,4'-biphenyl, and $Ar_2$ is at least one group selected from 1,4-phenylene, 2,6-naphthyl, and 4,4'-biphenyl with the proviso that $Ar_1$ and $Ar_2$ are different. Aromatic carboxylic acid monomers selected from parahydroxybenzoic acid, 2-hydroxy-6-naphthoic acid, and 4'-hydroxy-4-biphenylcarboxylic acid, that may optionally be acetylated and or have the ring substitution previously discussed are polymerized while under a shearing stress and present with a molten preformed thermoplastic polymer in order to fibrillate the resulting copolyester and form a reinforced composite material.

In other words, the present invention is a composite resin material prepared by reinforcing a thermoplastic resin with a fibrillar copolyester represented by the formula (1) which is obtained by polymerizing at least two hydroxy aromatic carboxylic acid monomers selected from parahydroxybenzoic acid, 2-hydroxy-6-naphthoic acid, and 4'-hydroxy-4-biphenylcarboxylic acid, including the derivatives thereof as previously discussed. At least two hydroxy aromatic carboxylic acids are copolymerized within a thermoplastic resin while under a shearing stress. The thus obtained copolyester is a fibrous polymer having a large aspect ratio of at least 3.

The present invention is described in detail hereinafter.

The thermoplastic polymer used as a matrix in the present invention should be non-reactive with the fibrous polymer in the production of the above fibrillar copolyester (fibrous polymer) and have such a high melting point that it does not evaporate during the polymerization, preferably at least 200° C., and a softening point of at least 180° C. The fibrous polymer generated by polymerization and the fiber reinforced composite material is thermally stable.

When active hydrogen or the like is contained in the skeleton of the thermoplastic resin used, the decomposition of the generated polymer occurs disadvantageously. When the thermoplastic resin used is a polyester, ester exchange may take place disadvantageously. Preferred examples of the thermoplastic resin include polyphenylene oxide, polyphenylene sulfide, polyether sulfone, and the like.

The polymer material is blended into the thermoplastic resin used in such a manner that the quality of the fibrous copolyester generated is 1 to 30% by weight based on the weight of the preformed thermoplastic polymer. When the proportion of the fibrous polymer is large, it is difficult to achieve a fibrous configuration. Therefore, the preferred proportion of the fibrous polymer is around 10% by weight at most based on the weight of the preformed thermoplastic polymer.

The starting materials for the production of the copolyester of formula (1) are hydroxy aromatic carboxylic acid monomers whose illustrative examples are parahydroxybenzoic acid, 2-hydroxy-6-naphthoic acid, and 4'-hydroxy-4-biphenylcarboxylic acid, including monomers having substituents on aromatic rings thereof and the acetylated products thereof. The particularly preferred monomers are 4-hydroxybenzoic acid, 2-hydroxy-6-naphthoic acid, and derivatives thereof.

Since a hydroxy aromatic carboxylic acid having an acetylated hydroxy group may be used as a starting material, an acetoxy group may be preliminarily introduced into the hydroxy aromatic carboxylic acid in a polymerization zone and the resulting acid may be used for direct polymerization in the same zone.

A zone of shearing generated during polymerization can be formed between a stirrer and the wall of a reactor by increasing the rotation speed of the stirrer or by generating shearing stress which is created by making the configuration of the stirrer and the reactor cylindrical. The shearing speed of the stirrer is preferably at least 2.0 $sec^{-1}$.

The reaction temperature is at least 230° C. It preferably is in the range of 250° to 350° C.

During the course of the polymerization to form the fibrous polymer, the acetic acid by-product or the like is removed from the system. This is made possible by reducing the pressure in the reactor at the time of the polymerization. The reduced pressure is preferably 20 Torr or less.

A catalyst commonly used for the polymerization of a polyester can be employed in an amount that it does not give a harmful effect such as the deterioration to the matrix resin. The catalyst also can be employed during the acetylation.

According to the method of the present invention, a reinforced composite material can be obtained simply by kneading and polymerizing a fibrous copolyester having heat resistance and a reinforcing effect into a molten preformed polymer matrix to be reinforced.

The copolyester has the following differences from a homopolyester:
1) The polymerization speed, that is, the process temperature is reduced while excellent heat resistance is retained in the product, and
2) The polymerization reaction is gentler than that of a homopolymer.

Therefore, compared with a homopolyester, the following advantages can be obtained when a copolyester is used.
1) Since a polymerization reaction is gentle, the aspect ratio can be controlled easily by the shearing speed and other polymerization conditions.
2) The dimensional stability of the resulting fibrous material is good.
3) Deterioration of a polymer matrix at the time of kneading the polymer is reduced.
4) Since thermal deterioration of the resin is reduced due to a low process temperature, recycling is possible.

EXAMPLES

The following examples are given to further illustrate the present invention. However, it is understood that the present invention is not limited to these examples.

Evaluation methods in the examples are as follows.
1) aspect ratio: measurement values obtained using a scanning electron microscope manufactured by Hitachi, Ltd.
2) flexural strength: tested in accordance with ASTM D790.
3) tensile strength: tested in accordance with ASTM D638.
4) tensile elongation: tested in accordance with ASTM D638.
5) thermal deformation temperature: tested in accordance with ASTM D648.

Example 1

300 g of polyphenylene sulfide (Fortron of a noncharged grade manufactured by Polyplastics Co., Ltd.) as a thermoplastic resin, 43.1 g (97 mol % of the total number of polymer recurring units) of 4-acetoxybenzoic acid and 1.7 g (3 mol % of the total number of polymer recurring units) of 2-acetoxy-6-naphthoic acid were charged into a Plastomil reactor (manufactured by Toyo Seiki Co.) and stirred and heated at a shearing speed of 3.0 $sec^{-1}$ under a nitrogen atmosphere. The temperature was elevated to 330° C. in 30 minutes and the reaction was carried out for 1 hour at that temperature. The resulting reaction product was taken out, cooled and dried at 100° C. for 8 hours.

The fibrous material contained in the thus obtained product was found to have an average aspect ratio of 5.3 when measured by a scanning electron microscope (SEM manufactured by Hitachi, Ltd.). The physical properties of the resulting product (composite resin material) were evaluated. Results are shown in Table 1.

Examples 2 to 4

As shown in Table 1, a reaction was carried out under the same conditions as in Example 1 except that types and amounts of starting monomers were changed to obtain reaction products, and their physical properties were evaluated in the same manner as in Example 1. Results are shown in Table 1.

Example 5

A reaction product was obtained in the same manner as in Example 1 except that 33.1 g (97% of the total number of polymer recurring units) of 4-hydroxybenzoic acid, 1.4 g (3% of the total number of polymer recurring units) of 2-hydroxy-6-naphthoic acid and 25.2% of acetic anhydride were used, and its physical properties were evaluated in the same manner as in Example 1. Results are shown in Table 1.

Comparative Examples 1 to 3

Resin compositions containing glass fiber and potassium titanate whiskers as fibrous reinforcement were prepared for comparison. As for their physical values, the values reported in catalogues for the commercial products are identified.

Comparative Example 4

As shown in Table 1, a reaction was carried out under the same conditions as in Example 1 except the types of starting monomers were changed and the polymerization time was changed to 1 hour to produce a homopolyester reaction product, and its physical properties were evaluated. The results are reported in Table 1.

Comparative Example 5

A reaction product was obtained in the same manner as in Comparative Example 4 except that the polymerization time was changed to 2 hours, and its physical properties were evaluated. The results are reported in Table 1. The aspect ratio of a homopolyester was changed by a slight change in the polymerization conditions and its quality was unstable. When a reaction was carried out for a polymerization time of 2 hours in Example 1 to obtain a reaction product, the aspect ratio and the physical properties of the resulting composite material were the same as in Example 1.

TABLE 1

| | Resin Composition (Composition in %) | Reinforcement (types, composition ratio $Ar_1/Ar_2$;%) | Aspect Ratio | Flexural Strength MPa | Tensile Strength MPa | Tensile Elongation % | Thermal Deformation °C. |
|---|---|---|---|---|---|---|---|
| Example 1 | PPS/copolyester(91/9) | Ph/Nh;97/3 | 5.3 | 210 | 130 | 10 | 240 |
| Example 2 | PPS/copolyester(91/9) | Ph/Nh;90/10 | 4.8 | 200 | 110 | 11 | 230 |
| Example 3 | PPS/copolyester(91/9) | Nh/Ph;97/3 | 5.2 | 200 | 110 | 12 | 220 |
| Example 4 | PPS/copolyester(91/9) | Ph/biPh;97/3 | 5.5 | 210 | 120 | 10 | 240 |
| Example 5 | PPS/copolyester(91/9) | Ph/Nh;97/3 | 5.3 | 210 | 130 | 10 | 240 |
| Comparative Example 1 | PPS/GF (90/10) | — | — | 180 | 135 | 7.5 | 175 |
| Comparative Example 2 | PPS/GF (70/30) | — | — | 245 | 191 | 2.2 | 260 |
| Comparative Example 3 | PPS/whisker (70/30) | — | — | 185 | 113 | 2.0 | 240 |
| Comparative Example 4 | PPS/homopolyester (91/9) | Ph;100 | 5.8 | 210 | 130 | 8 | 240 |
| Comparative Example 5 | PPS/homopolyester (91/9) | Ph;100 | 4.0 | 170 | 110 | 9 | 210 |

*Ph; 1.4-phenylene
Nh; 2,6-naphthyl
biPh; 4,4'-biphenylene

Example 6

When a polymerization reaction was carried out under the same conditions as in Example 1 except that the pressure of the system was reduced to 10 Torr at 330° C. during polymerization, a fibrous material having an aspect ratio of 5.5 was obtained 20 minutes after the reaction was commenced. When a reaction was carried out under the same conditions as in Example 1 without reducing the pressure on the system, a fibrous material having an aspect ratio of 5.0 was obtained 20 minutes after the reaction was commenced.

Comparative Example 6

A reaction product was obtained in the same manner as in Example 1 except that the shearing speed was changed to 1.0 sec$^{-1}$. The resulting fibrous material had an aspect ratio of 2.1. When the shearing speed was changed to 3.0 sec$^{-1}$ in Example 1, the resulting material had an aspect ratio of 5.3.

We claim:

1. A process for producing a composite resin material comprising polymerizing to form a copolyester at least two different hydroxy aromatic carboxylic acid monomers wherein one monomer is provided in a concentration of 1 to 12 mole percent and another monomer is provided in a concentration of 88 to 99 mole percent selected from the group consisting of parahydroxybenzoic acid, 2-hydroxy-6-naphthoic acid, and 4'-hydroxy-4-biphenylcarboxylic acid, including said monomers wherein hydroxy groups are acetylated, while present with a molten preformed thermoplastic polymer selected from the group consisting of polyphenylene oxide, polyphenylene sulfide, and polyether sulfone while imparting a shearing stress at a speed of at least 2.0 sec.$^{-1}$ to the reaction mixture to fibrillate the resulting copolyester within said thermoplastic polymer wherein the concentration of said resulting copolyester ranges from 1 to 30 percent by weight of the said preformed thermoplastic polymer.

2. The process as claimed in claim 1, in which an acetoxy group is introduced into the hydroxy aromatic carboxylic acid monomers in a reactor and the resulting acid is polymerized directly.

3. The process as claimed in claim 1, in which the reaction pressure in a reactor is reduced during the polymerization.

4. The process as claimed in claim 1, wherein the aspect ratio of said resulting fibrillar copolyester is at least 3.

5. A composite resin material formed by the process of claim 1 wherein the aspect ratio of said resulting fibrillar copolyester present therein is at least 3.

6. A composite resin material according to claim 5 wherein said thermoplastic polymer is polyphenylene oxide.

7. A composite resin material according to claim 5 wherein said thermoplastic resin is polyphenylene sulfide.

8. A composite resin material according to claim 5 wherein said thermoplastic resin is polyether sulfone.

* * * * *